United States Patent [19]

Kyle

[11] Patent Number: 4,493,218

[45] Date of Patent: Jan. 15, 1985

[54] TRANSDUCER SYSTEM EMPLOYING A SPRING WITH LINEAR CHARACTERISTICS

[76] Inventor: James C. Kyle, 610 Woodwillow St., Roseburg, Oreg. 97470

[21] Appl. No.: 461,631

[22] Filed: Jan. 27, 1983

[51] Int. Cl.³ .............................................. G01L 1/04
[52] U.S. Cl. ...................................... 73/862; 73/161; 73/509
[58] Field of Search ................ 73/862, 862.08, 862.38, 73/161, 488, 505, 509, 490

[56] References Cited

U.S. PATENT DOCUMENTS 3,999,426 12/1976 Sonderegger ..................... 73/862.08

FOREIGN PATENT DOCUMENTS 679391 4/1930 France ................................. 73/862

Primary Examiner—Jerry W. Myracle
Attorney, Agent, or Firm—Ellsworth R. Roston; Charles H. Schwartz

[57] ABSTRACT

Apparatus indicating the linear movement of a member includes a pulley and a spring disposed on the pulley and having characteristics of producing a force substantially linearly related to its speed of movement with respect to the pulley. A motor produces a displacement of the spring relative to the pulley. A transducer produces a signal related to the speed of movement of the spring relative to the pulley at each instant and provides a signal linearly related at that instant to the distance of the spring movement at that instant. A cam may also be included for converting the movement of the spring into a non-linear function having particular characteristics. Such cam may have a particular non-linear relationship on its external periphery relative to its axis of rotation. The cam and the pulley may be coupled to opposite ends of the spring to provide a conversion between the linear movement of the spring and the particular non-linear relationship provided by the cam. The spring has a particular catenary response as it becomes unwound from the pulley. A pre-programmed read-only memory may be included for adjusting the speed of movement of the spring from the pulley at each instant to compensate for the catenary response of the spring. The spring may be included in arrangements for providing for the determination of different parameters. For example, the spring may be included in arrangements for determining the parameters of a sucker rod in an oil well.

14 Claims, 5 Drawing Figures

U.S. Patent   Jan. 15, 1985   4,493,218
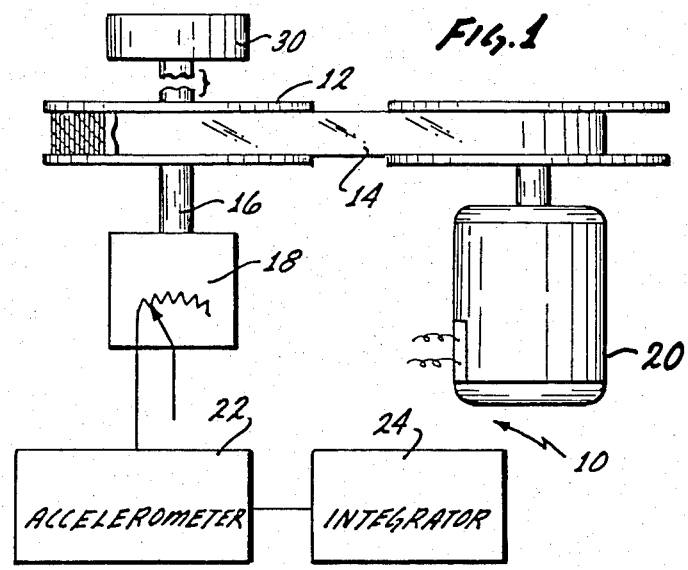
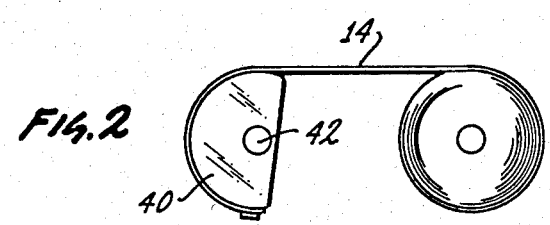
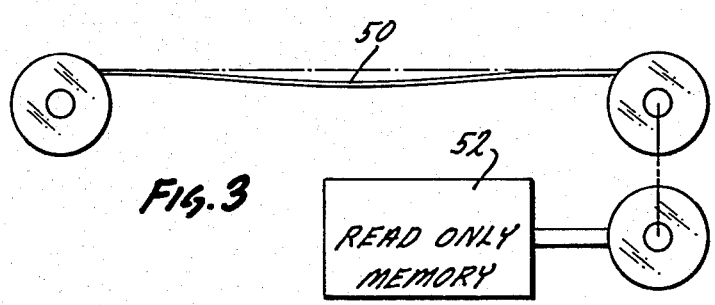
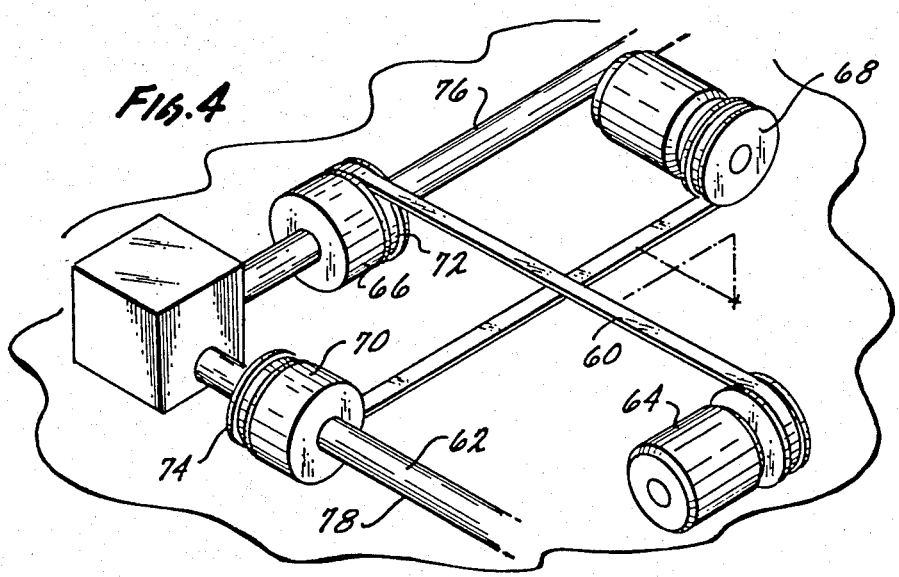
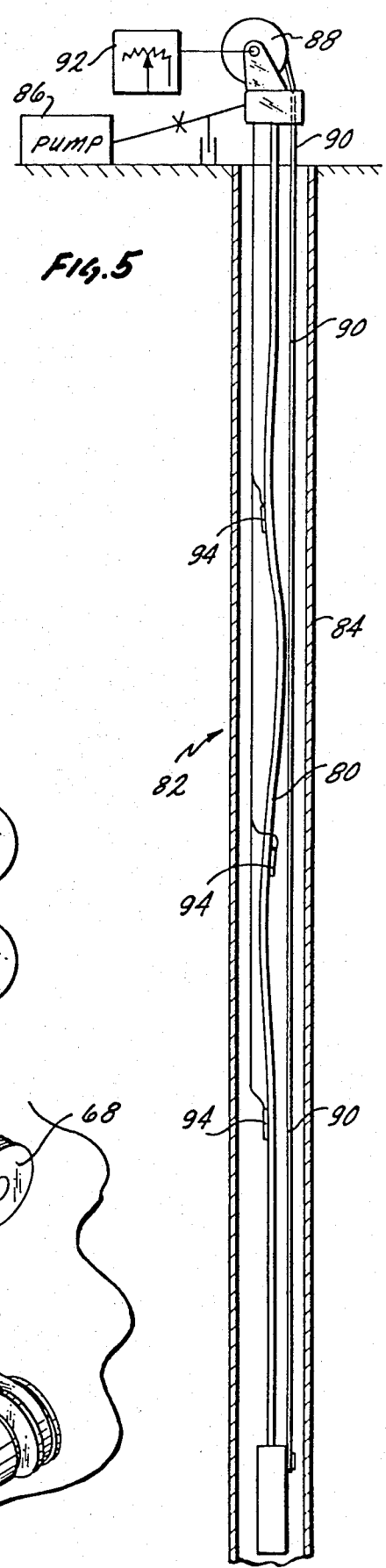

TRANSDUCER SYSTEM EMPLOYING A SPRING WITH LINEAR CHARACTERISTICS

This invention relates to apparatus for providing an indication of the force on, or movement of, a member at each instant. More particularly, this invention relates to apparatus employing a spring with particular characteristics for providing such indications of force or movement.

It is often necessary to provide an indication of the linear movement of a member. For example, indications are often desired of the speed at which a member is moving at each instant. Indications are also often desired of the distance through which a member has moved at each instant.

Since measurements of speed and distance are common, various systems have been developed to provide such measurements. These systems are generally complicated and are often not accurate. In spite of substantial efforts which have been devoted over a considerable number of years, a simple, satisfactory and reliable system is still not available.

This invention provides apparatus for indicating the linear movement of a member. The apparatus includes a pulley and a spring disposed on the pulley and having characteristics of producing a force substantially linearly related to its speed of movement with respect to the pulley. Means are included for producing a displacement of the spring with respect to the pulley.

Means are also included for producing a signal related to the speed of movement of the spring with respect to the pulley at each instant. Such means may provide a signal linearly related to the speed of movement of the spring with respect to the pulley at each instant. Such means may also provide a signal linearly related at that instant to the distance through which the spring has moved at that instant.

Means may also be included for converting the movement of the spring into a non-linear function having particular characteristics. Such means may include a cam having a particular non-linear relationship on its external periphery relative to its axis of rotation. The cam may be operatively coupled to one end of the spring and the pulley may be coupled to the other end of the spring to provide a conversion between the linear movement of the spring and the particular non-linear relationship provided by the cam means.

The spring has a particular catenary response as it becomes unwound from the pulley. Means be included from the pulley at each instant to compensate for the catenary response of the spring.

The spring may be included in arrangements for providing for the different parameters. For example, the spring may be included in arrangements for determining the parameters of a sucker rod in an oil well.

IN THE DRAWINGS

FIG. 1 is a schematic diagram of apparatus which employs a spring for determining the linear movements of a member;

FIG. 2 is a schematic diagram of apparatus employing a spring for providing a conversion between the linear movements of a member and a particular non-linear relationship;

FIG. 3 is a schematic diagram of apparatus for compensating for any non-linear response resulting from catenary effects on the spring in the unwound position of the spring;

FIG. 4 is a schematic diagram of apparatus employing springs for determining the movements of a member in two co-ordinate directions; and FIG. 5 is a schematic diagram of apparatus employing springs for determining the parameters of a sucker rod in an oil well.

In one embodiment of the invention, apparatus generally indicated at 10 in FIG. 1 is provided for measuring the linear movements of a member. Such measurements may relate to speed of movement of the member or the distance through which the member becomes displaced. The apparatus may include a pulley 12 and a spring 14 wound on the pulley. The spring 14 has characteristics of producing on the pulley 12 a force at each instant linearly related to its movement at that instant. The spring 14 may be obtained from the Hunter Division of Ametek, Inc., in Hatfield, Pennsylvania. A shaft 16 is extended from the pulley 12 and a transducer such as a potentiometer 18 is operatively coupled to the shaft 16. A motor 20 is operatively coupled to the spring 14 at the end opposite the pulley 12 to unwind the spring from the pulley 12 or to wind the spring on the pulley. The motor 20 may be considered to constitute a schematic representation in that it can constitute any type of an output member which may be movable linearly in the direction of the spring to wind or unwind the spring relative to the pulley 12.

The motor 20 may be operated with a constant force to unwind the spring 14 from the pulley. Under such circumstances, the spring 14 produces a constant force on the pulley as it unwinds from the pulley. This force remains constant regardless of the length of the spring remaining wound on the pulley at each instant. The potentimeter 18 produces at each instant a signal representing the displacement of the spring 14 from the pulley 12.

Similarly, the spring 14 may be wound by the motor 20 on the pulley 12. The spring 14 produces on the pulley 12 at each instant a force linearly related to the movement of the spring at that instant. This force produces an operation of the potentiometer 18 at each instant to provide an output indication of the displacement of the spring.

An accelerometer 22 may also be coupled to the shaft 16. The accelerometer 22 produces at each instant a signal related to the force on the pulley at that instant. This signal may be integrated by an integrator 24 to produce at each instant a signal related to the speed of the spring 14 at that instant.

Apparatus is also shown in FIG. 1 for generating a signal related to the movements of the spring. The apparatus may include a generator 30 which is coupled to the shaft 16 to produce a signal having at each instant an amplitude dependent upon the velocity of movement of the spring 14 with respect to the pulley 12 at that instant. The signal from the generator 30 may be used to energize electrical stages (not shown).

Means may be provided for converting the linear movement of the spring 14 into a particular non-linear function. Such means may include a cam 40 (FIG. 2) rotatable on a pivot pin 42. The exterior surface of the cam 40 may be provided with characteristics to convert the linear movement of the spring 14 into a non-linear function such as a trigonometric relationship. For example, the external surface of the cam 40 may be shaped to provide a sinusoidal relationship with respect to the linear movement of the spring 14. A transducer such as a potentiometer may be coupled to the cam 40 to determine the rotary displacement of the cam at each instant.

As the spring 14 is moved outwardly from the pulley 12, it may tend to sag from its own weight. This is indicated at 50 in FIG. 3. This is particularly true when the spring 14 has an extended length such as approximately three feet (3'). The sag in the spring 14 provides the spring with a catenary configuration. A pre-programmed read-only memory 52 may be coupled to the motor 18 to compensate for the sag of the spring 14 so that the movement of the spring may continue to be linear.

FIG. 4 illustrates an arrangement for measuring the linear displacement of a pair of springs along a pair of co-ordinate axes. For example, the apparatus of FIG. 5 may be used as a drafting instrument. The apparatus includes a pair of springs 60 and 62 disposed for displacement along a pair of co-ordinate axes. The spring 60 may be operated by a motor 64 to provide in a potentiometer 66 a voltage representing at each instant the displacement of the spring along the X-axis. Similarly, the spring 62 may be operated by a motor 68 to provide in a potentiometer 70 a voltage representing at each instant the displacement of the spring along the X-axis. The springs 60 and 62 are respectively wound on pulleys 72 and 74 which may be slidable relative to shafts 76 and 78 defining the co-ordinate cross arms of the drafting instrument.

An arrangement similar to those described above is shown in FIG. 5 to indicate the displacement of a sucker rod 80 in an oil well generally indicated at 82. The sucker rod 80 is disposed in a stationary sleeve 84 and is operatively coupled to equipment such as a pump 86 to be raised and lowered in the sleeve. A pulley 88 is disposed above the earth's surface and a spring 90 corresponding to those described above is wound at one end of the pulley 88. The spring 90 is coupled at its other end to the sucker rod 80 for movement with the rod. A potentiometer 92 is rotatable with the pulley 88 to indicate the displacement of the spring. Strain gages or sensors 94 may be disposed at spaced positions along the length of the sucker rod 80 to measure the lateral vibrations of the sucker rod.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination,
a pulley,
a spring disposed on the pulley and having characteristics for producing a force substantially linearly related to the displacement of the spring relative to the pulley,
means for driving the spring to become wound on the pulley or to become unwound from the pulley, and
means for converting the displacement of the spring into a signal having characteristics linearly related to the displacement of the spring.

2. The combination set forth in claim 1 wherein
means are responsive to the displacements of the spring relative to the pulley for providing for the generation of energy in accordance with such displacement.

3. The combination set forth in claim 1 wherein
means are operatively coupled to the spring for converting the linear force from the spring to a non-linear force having a particular relationship to the linear force.

4. The combination set forth in claim 3 wherein
the means for converting the linear force to the non-linear force includes a cam.

5. The combination set forth in claim 1 wherein
the spring has characteristics of producing a catenary force as it becomes unwound from the pulley and
means are included for adjusting the displacement of the pulley at each instant to compensate for such catenary force at that instant.

6. The combination set forth in claim 5 wherein
cam means having a particular non-linear relationship are provided and wherein
the spring is operatively coupled to the pulley at one end and to the cam means at the other end to provide a conversion between the linear displacement of the spring and the particular non-linear relationship provided by the cam means.

7. The combination set forth in claim 6 wherein
means are operatively coupled to a particular one of the pulley and the cam means for providing a response related to the displacement of the particular one of the pulley and the cam means.

8. The combination set forth in claim 5 whether
the spring has a catenary response as it becomes unwound from the pulley and
means are included for adjusting the displacement of the spring from the pulley at each instant to compensate for the catenary response of the spring at that instant.

9. In combination,
a pulley,
a spring disposed on the pulley and having characteristics of producing a force substantially linearly related to its displacement with respect to the pulley,
means for producing a displacement of the spring with respect to the pulley, and
means for producing a signal related at each instant to the displacement of the spring with respect to the pulley at that instant.

10. The combination set forth in claim 9 wherein
the signal-producing means produces a signal linearly related at each instant to the speed of movement of the spring with respect to the pulley at that instant.

11. The combination set forth in claim 9 wherein
means are responsive to the displacement of the spring at each instant for converting such movement into a non-linear function having particular characteristics relative to the displacement of the spring.

12. In combination,
a pulley,
a spring disposed on the pulley and having characteristics of producing a force substantially linearly related to its displacement with respect to the pulley,
means for producing a displacement of the spring with respect to the pulley,
means for compensating at each instant in the displacement of the pulley for any catenary effect resulting from the displacement of the pulley, and
means for providing an indication of the displacement of the pulley at each instant.

13. The combination set forth in claim 12, including, cam means defining a particular non-linear relationship on its external periphery, the spring being coupled at opposite ends to the pulley and the cam means to become wound on a particular one of the pulleys and the cam means and to become unwound from the other one of the pulley and cam means and to provide a conversion between the linear relationship of the pulley and the particular non-linear relationship of the cam means in accordance with such displacement.

14. The combination set forth in claim 13, including, means operatively coupled to a particular one of the pulley and the cam means for generating a signal directly related to the particular one of the pulley and the cam means.

* * * * *